UNITED STATES PATENT OFFICE.

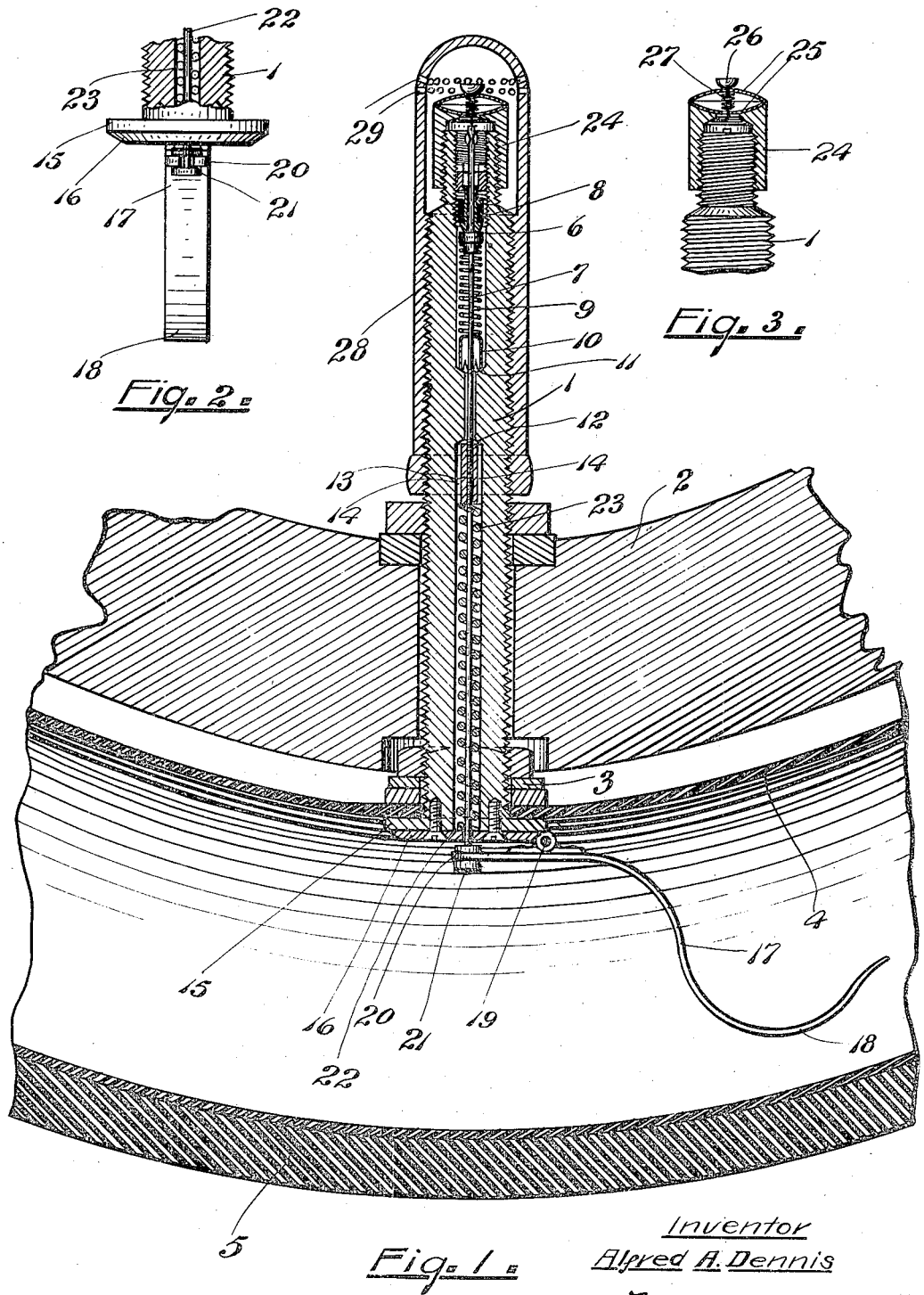

ALFRED A. DENNIS, OF GRAND RAPIDS, MICHIGAN, ASSIGNOR OF ONE-HALF TO HENRY G. KREKEL, OF GRAND RAPIDS, MICHIGAN.

VALVE AND ALARM FOR TIRES.

1,244,181.   Specification of Letters Patent.   Patented Oct. 23, 1917.

Application filed February 5, 1916. Serial No. 76,378.

*To all whom it may concern:*

Be it known that I, ALFRED A. DENNIS, a citizen of the United States of America, residing at Grand Rapids, in the county of Kent and State of Michigan, have invented certain new and useful Improvements in Valves and Alarms for Tires; and I do hereby declare the following to be a full, clear, and exact description of the invention, such as will enable others skilled in the art to which it appertains to make and use the same.

This invention relates to a valve and alarm construction for pneumatic tires, and it is the primary object and purpose thereof to provide an alarm structure which may be applied to the ordinary standard valve construction used in the inflation of air tubes of pneumatic tires, said construction comprising devices which will operate automatically as the pressure within an air tube in use on a motor vehicle is decreased beyond a certain predetermined amount to unseat the parts of the valve and permit the escape of air from the air tube, the invention further including an alarm preferably a whistle which will be operated to sound with the escape of the air. A further object of the invention consists in the provision of a construction which can be manufactured at an exceptionally low cost and applied to valves of this character, it being possible to equip an air tube with this device without appreciable increase in the cost of the combined tube and valve. Various other features inherent in the construction and operation of the device, such as the folding of the air tube when not in use as compactly as air tubes are now folded together, constructive features for eliminating any danger of destruction of the device should an air tube completely exhaust of air when in use on a motor vehicle, together with many other novel and useful features will be apparent as understanding of this construction is had as shown in the accompanying drawing, in which;

Figure 1 is a vertical section taken through a portion of a vehicle wheel equipped with an air tube having my invention applied thereto.

Fig. 2 is a fragmentary side elevation, with a part shown in section, of the lower portion of the valve stem with the invention applied thereto.

Fig. 3 is a fragmentary side elevation of the upper portion of the valve stem with the combined valve cap and whistle shown in section.

Like reference characters refer to like parts throughout the several views of the drawing.

In the disclosure of the invention I have shown a valve of ordinary construction having a valve stem 1 which is passed through the felly 2 of a wheel of a motor vehicle, being attached thereto in the usual manner and at its lower end having connection by the usual standard construction as indicated at 3 with an air tube 4 which in practice will be inclosed within the tire casing 5. The valve stem 1 is longitudinally bored in the usual manner and has adjacent the upper end of the openings made by said boring a valve member 6 upon a rod 7 which contacts with an adjacent valve member 8 being forced thereagainst by the coil spring 9 which is interposed between valve 6 and the sheet metal cap 10 seating against a shoulder 11 located within the valve stem as shown. This construction is of standard type and is practically the same that appears in every valve for pneumatic tires now in use.

The lower end of the rod 7 is extended through the restricted opening in the stem below shoulder 12 and threads into a block 13 which normally is forced against said shoulder as shown. A plurality of passageways 14 permit the passage of air by the block. The lower enlarged end or head 15 of the valve stem has a plate 16 secured thereto preferably by screws so as to be readily detachable. A lever 17 formed of thin flat spring steel and having a curved end 18 is pivotally mounted at 19 adjacent one side of the plate 16 and in such position as to lie lengthwise of the air tube when it is in use. An end of the member 17 is forked at 20, the forks passing to either side of a head 21 having slots in its sides for receiving the forks, which head is permanently secured at the lower end of a rod 22 extending through the valve stem and connecting with the block 13 heretofore described. The connection with the block 13 while illustrated as a screw connection, may be any suitable permanent connection if desired. A coil spring 23 is interposed between the plate 16 and block 13 tending to force the block against the shoulder 12. It should be understood that the connection of member 17 to the head 21 and the passage of rod 22 through plate 16 is sufficiently loose to permit limited movements thereof without binding. By use of the spring 23 spring 9 and the member 10 may be eliminated if desired though I have shown said parts in order to fully disclose the adaptation of my invention to a valve of ordinary standard construction.

The reduced outer end of the valve stem carries a valve cap 24 which is modified so as to include a whistle. This whistle may be of any desired type but as an illustration of one type there is shown a pair of convex members 25 brought together at their edges and separated at their centers with a central opening through each member, this being a well known and simple type of whistle. The opening in the outer member may be closed by a rounded plug 26 connected to a spring 27 of slight tension such that when pressure of air is brought against the plug the spring member permits the air to escape. The dust cap 28 for the valve is of the regular type except that adjacent its upper end a plurality of openings 29 are made.

In the operation of the invention when an air tube having the valve and the alarm attachment thereof is placed on a wheel and inflated with air to the required pressure it is designed that the curved end 18 of the member 7 shall be positioned a short distance within the wall of the tube. As the pressure within the tube decreases with the revolution of the wheel that part of the tire which comes adjacent the ground is flattened due to the weight of the vehicle and when it becomes sufficiently flattened so that the wall of the inner tube engages with the end 18 the member 17 is turned about its pivot drawing the rod 22 toward the interior of the tube and unseating the valve member 6 from member 8 whereupon air will escape from the tube, pass outwardly through the cap 24 and sound the whistle therein. Accordingly with every revolution of a wheel on which the tube has become sufficiently deflated for a sounding of the alarm, the alarm will sound and continue to sound until the tube is again inflated to proper pressure. This furnishes a sure alarm and notification of insufficient pressure in a tire.

From the foregoing it will be apparent that no modification in the existing valve is necessary for the use and application of my invention and that this device costs practically little or nothing to make. It will also be evident that this device works so as to unseat the valve parts in the usual and well known manner for deflating a tire, that is by moving the valve rod in a direction toward the interior of the air tube. This is a very marked and essential feature of my invention as by reason of it no costly or especial construction in the matter of valve mechanism for retaining air within a tire is necessary. Furthermore due to the material from which member 17 is formed it will not become broken nor bent so as to be useless even should a tire become entirely deflated as the resiliency of this member permits it to flatten out and be received within the edges of a wheel rim even though the tire is absolutely flat returning to normal position when the tire is again inflated. This is also of advantage in folding a deflated tire for purposes of transportation or the like.

Various slight modifications in detail may be resorted to without departing from the invention defined in the appended claims and accordingly I consider myself entitled to all modifications of structure falling within their scope.

I claim:—

1. In combination, an air tube, a valve construction attached thereto including a valve stem with a valve located therein normally preventing the escape of air from the tube, a rod connected to the valve and extending through the stem into the air tube, and means connected to the rod within the air tube for giving it a movement toward the interior of the tube upon flattening the tube a predetermined amount on the outer side thereof and at a point in proximity to the valve stem.

2. In combination, an air tube, a valve construction attached directly thereto including a valve stem and a movable valve located therein normally preventing the escape of air from the tube, means attached to said movable valve and extending through the stem into the air tube for moving the valve toward the tube to allow the escape of air on flattening of the tube a predetermined amount at a point in proximity to the valve stem, and an alarm operated by the escaping air.

3. In combination, a valve stem, a rod extending loosely therethrough, a relatively stationary valve part in the stem, a coacting valve part on the rod, spring means for normally engaging said valve parts together, a lever of flat resilient material mounted at an end of the valve stem and connected to the adjacent end of said rod, said lever having a curved portion extending away from the end of the valve stem, and an air alarm attached to the opposite end of the valve stem.

4. In combination, a valve stem having an opening therethrough from end to end, said opening being reduced in size between the ends of the stem, a relatively stationary valve part in the opening near one end of the stem, a rod passing through the opening at said end and through said reduced opening, a coacting valve part thereon, a block having passageways for the passage of air below said reduced opening into which said rod is threaded, a second rod secured at one end to said block and passing through the opening in the valve stem to the opposite end thereof, spring means for moving the rods to cause the valve parts to engage one another, means secured to the end of said second rod and connected to the valve stem for moving the rods to separate said valve parts, substantially as described, and an air alarm attached at the opposite end of the valve stem.

5. In combination, a valve stem having an opening therethrough from end to end, said opening being reduced in size between the ends of the stem, a relatively stationary valve part in the opening near one end of the stem, a rod positioned in the opening in the stem at one end thereof and passing through the reduced portion of said opening, a coacting valve part on the rod, a block having passageways for the passage of air below said reduced opening with which the end of said rod has detachable connection, a second rod secured at one end to said block and positioned in said opening of the valve stem, the opposite end of the rod extending beyond the other end of the stem, a plate attached to said end of the valve stem through which the second rod passes, a coiled spring under compression between the plate and block, a lever formed of flat resilient metal pivotally mounted between its ends at one edge of the plate, a connection between one end of the lever and the end of said second rod, and an air alarm attached at the opposite end of the valve stem.

6. In combination, a valve stem having an opening therethrough from end to end, a relatively stationary valve part in the opening near the upper end of the stem, a rod having a coacting valve part located in the upper part of the stem, a spring normally holding the valve parts together, a second rod in the lower part of the valve stem extending a short distance beyond the lower end of said stem, a detachable connection between the adjacent ends of said rods, and a lever pivotally connected to the lower end of the valve stem and a connection between one end of said lever and the lower end of said second rod.

7. In combination, an air tube, a valve construction attached thereto including a valve stem with a valve therein normally preventing the escape of air from the tube, a rod connected to the valve and extending through the stem into the air tube, a lever formed of flat resilient metal pivotally connected between its ends to the end of the valve stem within the tube and having a free end curved toward the opposite side of the air tube, and a connection between the opposite end of said lever and the end of said rod extending into the air tube.

8. In combination, an air tube, a valve stem secured to the air tube, a rod extending loosely therethrough, coacting valve parts on the stem and rod to prevent passage of air in one direction therethrough, a lever mounted at one end of the valve stem and located within said air tube and connected to the adjacent end of said rod, said lever having a curved free portion extending away from the end of the valve stem adapted to be received in a pneumatic tube to which the valve is attached.

In testimony whereof I affix my signature.

ALFRED A. DENNIS.